June 9, 1964     D. B. PASQUALE     3,136,574
SHOVEL
Filed April 26, 1962
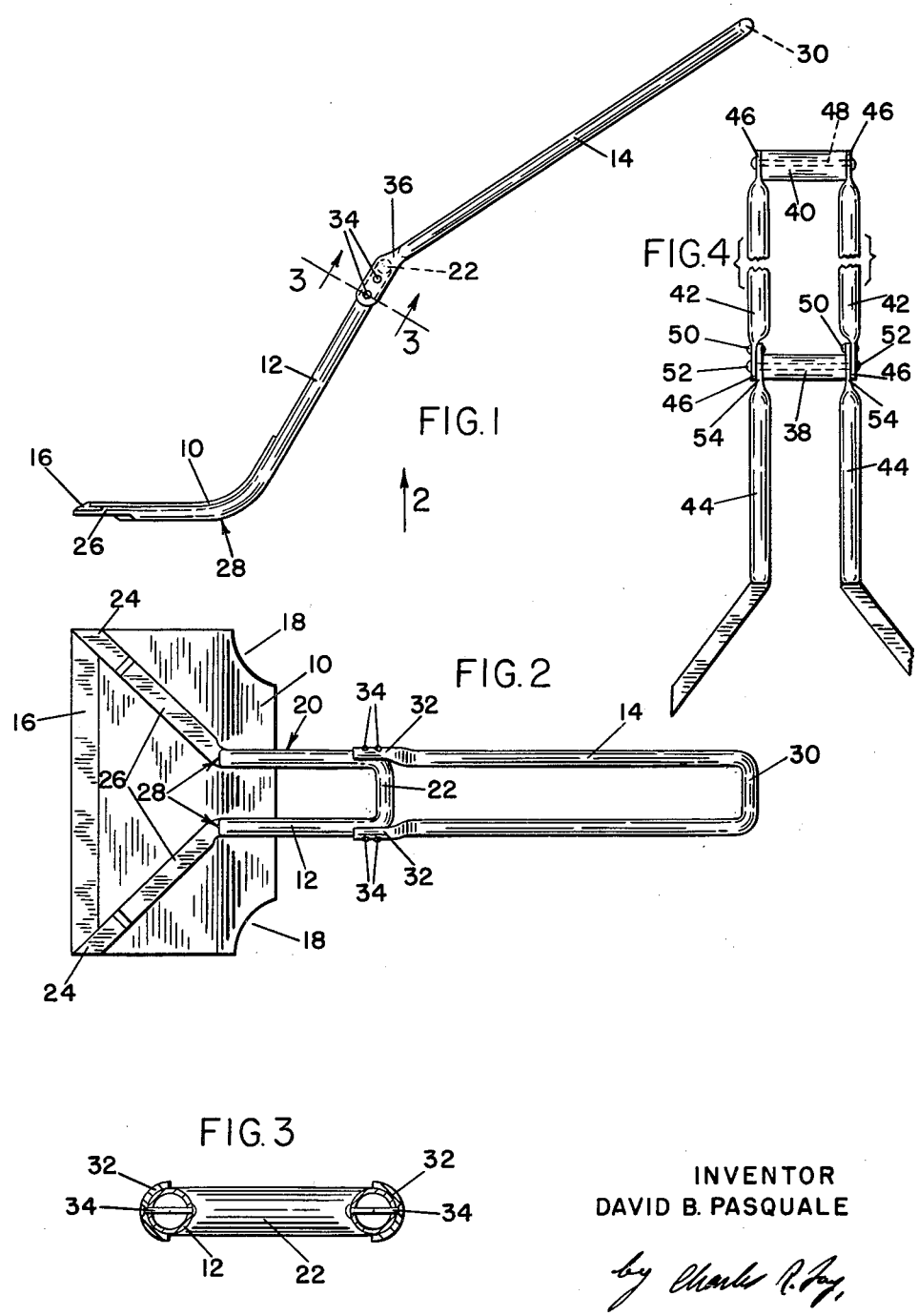
INVENTOR
DAVID B. PASQUALE
by Charles R. Fay,
ATTORNEY

United States Patent Office 3,136,574
Patented June 9, 1964

3,136,574
SHOVEL
David B. Pasquale, 60 Woodland St.,
West Boylston, Mass.
Filed Apr. 26, 1962, Ser. No. 190,332
4 Claims. (Cl. 294—54)

This invention relates to a new and improved shovel particularly of the snow shovel type having a relatively broad blade for scooping up lightweight materials. Of course the shovel can be used for any purpose for which it is desired or convenient, and the principal object of the invention resides in the provision of such a shovel which eliminates deep back bending and strain by the reason of the special novel construction thereof including a U-shaped handle comprising a pair of spaced members having a handle portion at the closed ends thereof as for the right hand of a right-handed shoveler and being connected to a somewhat similar frame for the blade, the handle being in effect an extension of the frame and being placed exactly in a position so that the blade of the shovel may rest on the ground and the hands are in natural position for the shoveling operation without however the necessity of bending far over or lifting to a very great degree to move and deposit the snow.

Further objects of the invention include the provision of a new and improved frame for the blade of the shovel which provides a fulcrum so as to provide for breaking the snow away from its bed without undue lifting, and also the frame provides runners whereby the snow or other material can be skidded away to a desired location without even lifting it from the ground at all.

Other objects and advantages of the invention will appear hereinafter.

Reference is to be had to the accompanying drawings, in which—

FIG. 1 is a view in side elevation showing the new shovel;

FIG. 2 is a bottom plan view, looking in the direction of arrow 2 in FIG. 1, with parts broken away and/or in section;

FIG. 3 is an enlarged section on line 3—3 of FIG. 1, and

FIG. 4 is a plan view showing a modified handle construction.

In carrying out the present invention, it is to be particularly noted that the same consists of three main parts, one of which is the blade 10, a frame and runner supporting member 12, and a handle member 14.

The blade itself may be of aluminum or plastic and may take any size or shape which may be desired. It should be provided with the usual steel forward edge 16 for purpose of wear and being particularly wide, it may have the corners at 18 cut out so as to avoid interference with the body of the user.

The part 12 is a tubing or a solid member if desired which is in general U shape as indicated at 20 in FIG. 2. This U has a closed end portion 22 which acts as a handle for the left hand as will be more apparent hereinafter. The ends of the legs of the U are divergent as indicated at 24, 24 and they are also flattened as at 26 (see particularly FIG. 1) for better securement to the blade 10 whether by fasteners or by welding or by whatever means is desired.

Looking at FIG. 1, it will be seen that the handle portion 12 extends to the rear from the flattened portion 26 to a point at 28 which acts as a fulcrum as will be hereinafter described and from there it turns upwardly at an angle, terminating in the aforesaid handle portion 22.

It will be seen, however, that the handle at 22 is rather short, i.e., it is located say about sixteen inches from the ground, and the extension handle portion 14 is secured thereto as will be described.

The handle portion 14 is also a U-shaped member but without diverging elements and has a closed end portion at 30 which acts as the handle for the right hand. The legs of the U-shaped member 14 terminate in flattened curved areas at 32 which are secured to the sides of the handle adjacent the handle 22 as is perhaps best illustrated in FIG. 3 at 34, being fastened by any desired means. The inner or free ends of the legs of the handle member 14 are bent downwardly as best shown in FIG. 1 at 36 so that the handle portion of the shovel extends up at the angle shown at FIG. 1 as to the members 12 and at a lesser angle with respect to the horizontal as to the elongated handle portion 14.

In the use of the device, the shovel may be placed upon the ground by means of the parts 24 of the handle portion 12 and the device can be used as a skid. It can rock upon its fulcrum and can be used to break the snow load from its bed without undue lifting or strain as will be clear.

The widespread support for the blade prevents breakage, it being noted that the flattened portions 24 of the handle parts 20 extend to the very corners of the blade 10 (see FIG. 2). The shovel will be seen to eliminate deep back bending and strain and can be utilized to shovel snow a great deal more rapidly than is possible with shovels of the prior art. In addition, the parts can be disengaged for storage and transportation particularly with respect to the two handle members, so that a relatively short handle only has to be taken account of in the shipping of the shovel, etc.

Referring now to the modification of FIG. 4, the handle construction here shown is made up in parts which are more easily packaged and shipped but at the same time when assembled provide for a strong handle construction which is easily set up by the consumer and is of the same general configuration and utility as that previously described.

This handle construction provides the cross handles similar to those at 22 and 30 in FIG. 2 but comprising wooden cylindrical members 38 and 40, these being alike. The elongated tubular member is made up of four separate parts which are tubes 42, 42 that are alike and the lower members 44, 44 which are also alike but reversed.

The tubes 42, 42 are flattened at their ends as at 46, 46 and at one end thereof are provided with single apertures for the reception of a rod 48 therethrough holding the handle 40 centrally thereof, but at the other ends the flattened portions are provided with two apertures for fasteners 50, 50 and a through rod 52 similar to that at 48 for holding the handle 38 in position as shown.

The lower members 44, 44 are flattened at 54, 54 and are provided with double apertures to receive fasteners 50, 50 and 52, 52.

Having thus described my invention and the advantages thereof, I do not wish to be limited to the details herein disclosed, otherwise than as set forth in the claims, but what I claim is:

1. A shovel of the class described comprising a blade, a first generally U-shaped tubular frame including spaced legs having parallel leg portions and divergent leg portions at corresponding ends of the parallel leg portions, a closed end member at the opposite ends of the parallel leg portions from the divergent leg portions, the divergent leg portions and parts only of the parallel leg portions being secured to the blade, the closed end member providing a first handle transversely arranged with respect to said parallel leg portions, a second U-shaped tubular frame including spaced legs having parallel leg portions, an end member transversely connecting the parallel leg portions of said second frame and forming a second handle member, the second U-shaped frame being substantially open at the end thereof opposite the second handle but being connected at said open end to the parallel leg portions of the first-named U-shaped frame adjacent to the first-named handle, means securing the second-named U-shaped frame to the first-named U-shaped frame in fixed relation thereto but at an angle with respect thereto, the parallel leg portions of the first-named U-shaped frame extending at a relatively sharp inclination with respect to the blade to the first-named handle, and the parallel leg portions of the second-named U-shaped frame extending at a lesser inclination from the first-named handle to the second-named handle, and the parallel leg portions of the second-named U-shaped frame being substantially longer than the lengths of the parallel leg portions of the first-named U-shaped frame so that the first-named handle is relatively closely adjacent the blade whereas the second-named U-shaped handle is at a relatively greater distance therefrom.

2. The shovel recited in claim 1 wherein the blade is generally rectangular and has a forward operative edge terminating in spaced corners, and said divergent leg portions of the first-named U-shaped frame extending to a point adjacent to the corners of the blade.

3. The shovel recited in claim 1 wherein the blade is generally rectangular and has a forward operative edge terminating in spaced corners, and said divergent leg portions of the first-named U-shaped frame extending to a point adjacent to the corners of the blade, and a steel edge at the forward edge of the blade connecting the ends of the divergent portions of the first-named U-shaped frame.

4. The shovel recited in claim 1 wherein the ends of the second-named U-shaped frame overlap the first-named handle on the first-named U-shaped frame and are generally flat and conform thereto, and the fasteners securing the flat ends of the second U-shaped frame to the first-named U-shaped frame adjacent the first-named handle being removable.

References Cited in the file of this patent

UNITED STATES PATENTS

| | | |
|---|---|---|
| 191,762 | Huth | June 12, 1877 |
| 321,326 | Waite | June 30, 1885 |
| 1,207,472 | Barton | Dec. 5, 1916 |
| 1,411,166 | Currier | Mar. 28, 1922 |
| 2,629,624 | Nelles | Feb. 24, 1953 |
| 3,024,547 | Harrison | Mar. 13, 1962 |